Patented Oct. 28, 1947

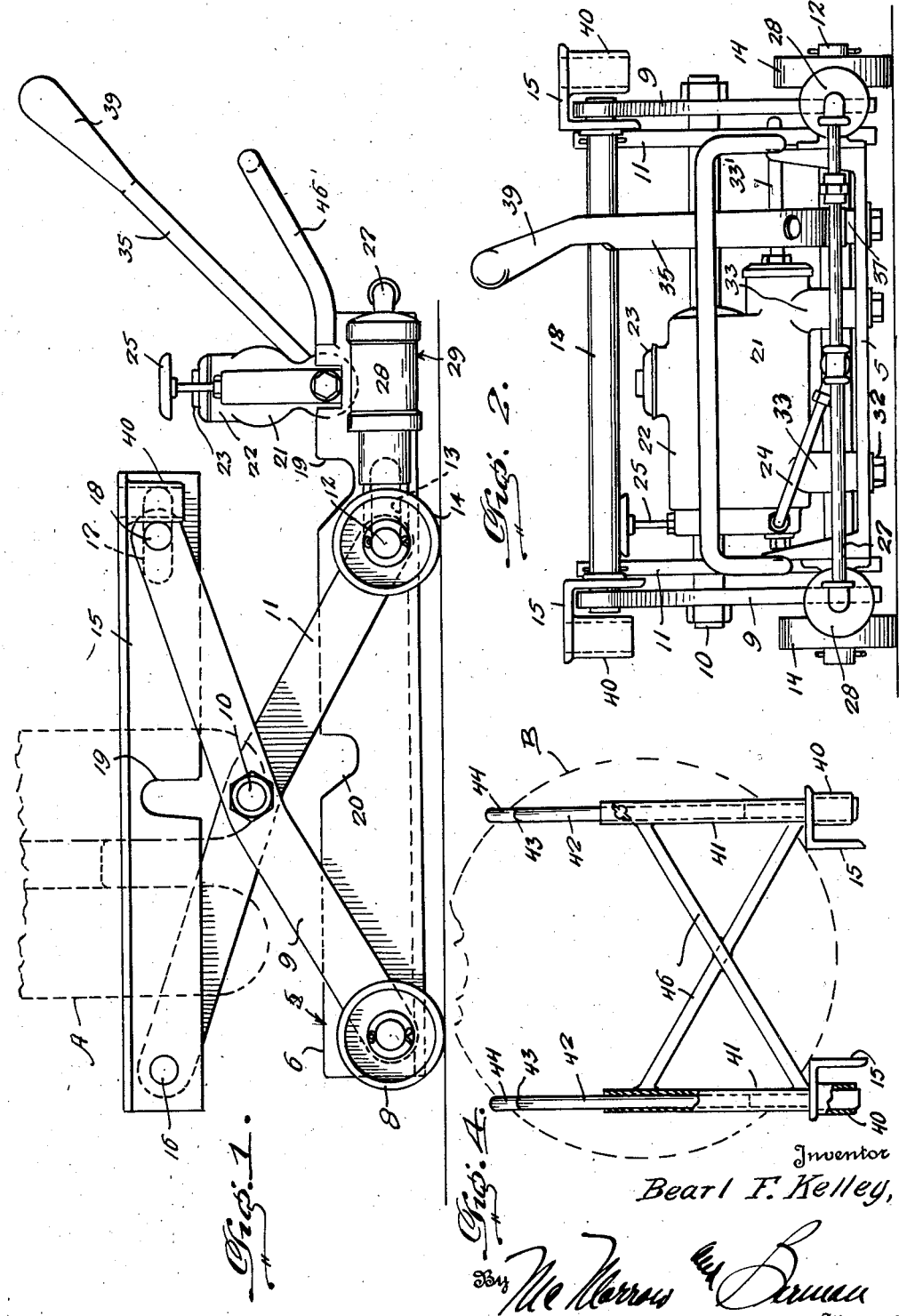

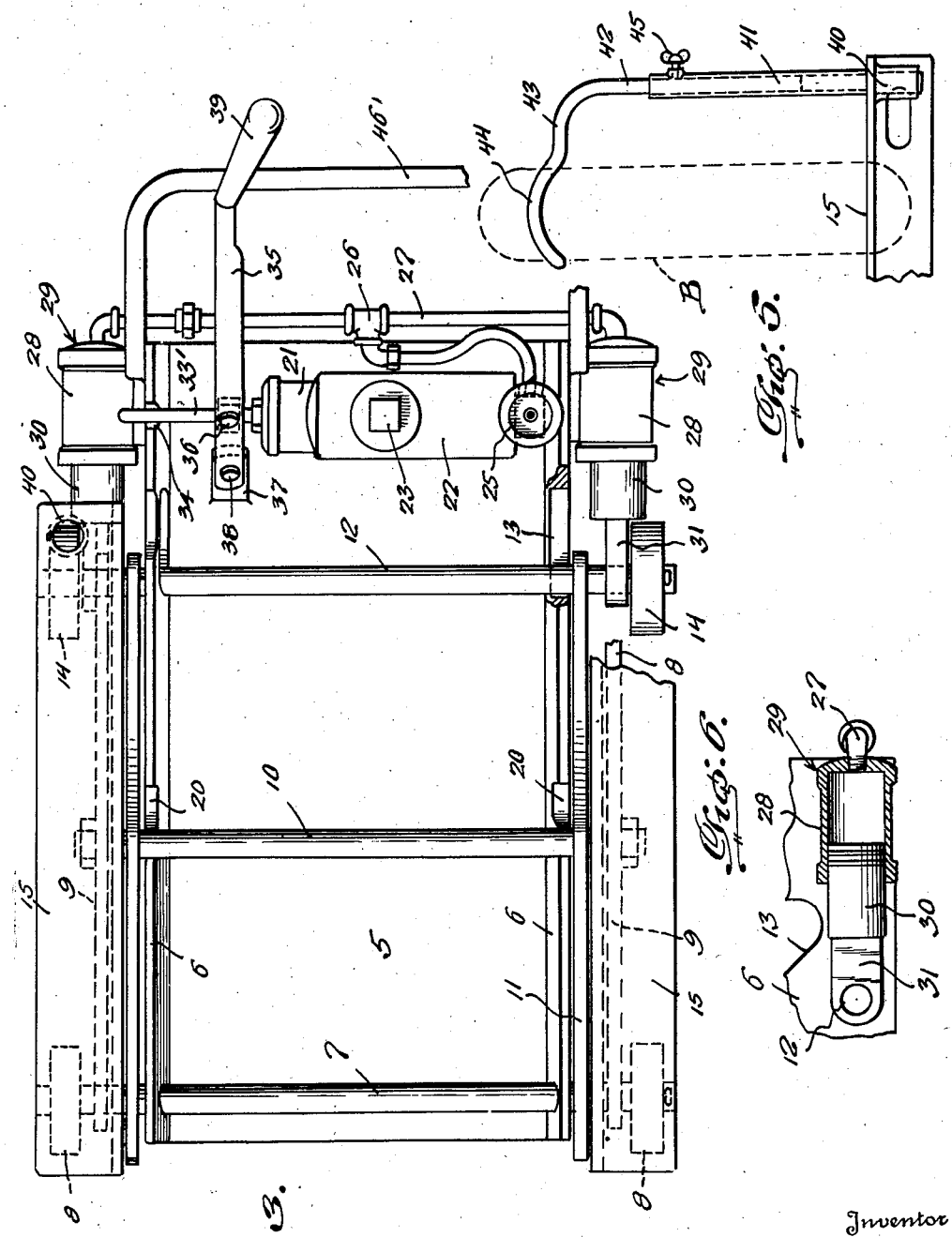

2,429,723

UNITED STATES PATENT OFFICE 2,429,723

WHEEL LIFTING TRUCK

Bearl F. Kelley, Cheyenne, Wyo.

Application October 30, 1944, Serial No. 561,084

2 Claims. (Cl. 280—44)

This invention appertains to new and useful improvements in wheel jacks and more particularly to a lift for removing and applying heavy duty wheels such as are used on busses and trucks.

At present, it requires several men to remove or apply heavy duty bus and truck wheels especially of the dual type.

The principal object of the present invention is to provide a wheel lift truck which can be readily set under a heavy duty truck or bus wheel to the end that the wheel can be elevated after its fastening means have been removed, and hauled away with but little effort on the part of the workman.

Another important object of the invention is to provide a heavy wheel lift, which in itself is capable of being easily operated and which includes hydraulic means for lifting the elevator means thereof.

Other objects and advantages of the invention shall become apparent to the reader of the following description.

In the drawings—

Figure 1 is a side elevational view.

Figure 2 is an end elevational view.

Figure 3 is a top plan view.

Figure 4 is an elevational view with parts broken away showing an attachment for holding a single wheel.

Figure 5 is a fragmentary side elevational view showing the single wheel holding means.

Figure 6 is a fragmentary sectional view of one of the hydraulic units.

Referring to the drawings, wherein like numerals designate like parts, it can be seen that a horizontal body 5 is provided with upstanding side walls 6, 6 which at one end has an axle 7 disposed therethrough, this axle having wheels 8 at its outer end.

A slightly angularly formed bar 9 is provided at each side of the body 5 and has its lower end apertured to receive the corresponding end of the axle 7. The intermediate portion of each of these bars 9 has a pivot member 10 disposed therethrough and also through the intermediate portion of a complemental bar 11 of like form.

A second axle 12 is disposed through slots 13 in the side walls 6 and the end portions of the axle 12 pass through openings in the lower ends of the bars 11, this axle 12 having ground riding wheels 14 at the ends thereof. It is preferable that the slots 13 in the wall 6 be reinforced by bearing ledges on which the axle 12 can ride, as shown in Figure 3.

The upper ends of the bars 9, 11, at each side of the body 5, are bridged by an angle bar 15, members 16 passing through the rear ends of the bars 15 to pivotally connect the upper ends of the bars 11 thereto while the remaining ends of the bars 15 are slotted as at 17 to receive a transverse bar 18 which projects through the upper ends of the bars 9 as in the manner substantially shown in Figure 3.

Obviously, the angle bars 15 will serve to support a dual assembly A in an upright position as shown in Figure 1.

The bars 15 are capable of overlapping the side walls 6 of the body 5 when lowered due to the presence of notches 19, 20 in the bars 15 and side walls 6, respectively, these notches serving to receive the pivot member 10.

On the forward end of the body 5 is a hydraulic cylinder 21 on which is a hydraulic fluid reservoir 22 having a filler cap 23. An outlet pipe 24 extends from the cylinder 21 and this outlet is regulated by a valve 25. The pipe 24 extends and connects by a fitting 26 to a cross line 27 connected at its ends to the cylinders 28 of hydraulic units generally referred to by numeral 29. In the cylinders 28 pistons 30 operate and from the pistons 30 members 31 project outwardly and are apertured to receive the end portions of the axle 12. The cylinders 28 are suitably secured to the side walls 6.

Legs 33 depend from the hydraulic cylinder 21 and rest on the body 5 and screws 32 are disposed upwardly through the body 5 and into the legs 33 to firmly secure the cylinder 21 and its reservoir 22 in place on the body.

As can be appreciated, the cylinder 21 contains a piston from which extends a piston rod 33'. The piston rod 33' extends through a notch 34 in one side wall 6 and has the intermediate portion of a control lever 35 clamped thereto as at 36. A lug 37 rises from the body 5 and the lower end of the lever 35 is pivoted thereto as at 38. The upper end of the lever 35 has a handle 39. Obviously, in the operation of the mechanism, the release valve 25 is first closed after which the lever 35 is oscillated to operate the piston in the cylinder 21, which forces fluid from the cylinder 21 to the units 29. This action forces the axle 12 rearwardly and elevates the crossed bars 9, 11, lifting a dual wheel assembly A to a position where it can be transported to the desired location.

When it is desired to lower the bars 15, the valve 25 should be opened thus gradually bleeding the units 29.

In handling heavy duty single wheels, which are apt to tip over on the bars 15, 15, the top flanges of the bars 15 are formed with sockets 40 at the rear ends thereof for receiving the lower ends of upstanding tubes 41. Rods 42 are vertically slidable in these tubes 41 and have outwardly disposed portions 43 terminating in hooks or arcuate extensions 44 adapted to engage over the tire of a single wheel B. A set screw 45 is carried by each vertical tube 41 and adapted to be screwed in against the rods 42 to hold the same in adjusted position against a wheel to prevent tipping over of the same.

The tubes 41 may be provided with crossed brace members 46, 46 to adequately support the same in an upright position.

A handle construction 46' is provided at one end of the body 5 to permit a person to easily move the device from place to place.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A wheel lift comprising a body, axles at each end of the body and having ground wheels journaled thereon, one of said axles being fixed and the other axle being slidable in the body relative to the fixed axle, an elevator, said elevator being adapted to support a heavy duty wheel unit, crossed raising elements supporting the elevator and having their lower ends pivoted to the axles, and hydraulic means for slidably actuating the second-named axle to effect a raising and lowering of the elevator.

2. A wheel lift comprising a body, wheels at one end of the body, an elevator, said elevator being adapted to support a heavy duty wheel unit, crossed raising elements for lifting and lowering the elevator an hydraulic means for effecting a raising action of the said crossed elements, an axle disposed through certain lower ends of the crossed elements and ground engaging wheels carried by the axle, said hydraulic means comprising a pair of hydraulic units, a manually operated pump unit, a connection between the pump unit and the hydraulic unit, said body having a guideway therein through which the axle is disposed, said hydraulic units operating on said axle.

BEARL F. KELLEY.

REFERENCES CITED

The following references are of record in the file of this patent:

UNITED STATES PATENTS

| Number | Name | Date |
| --- | --- | --- |
| 1,555,152 | Passow | Sept. 29, 1925 |
| 1,640,297 | Rogers | Aug. 23, 1927 |
| 2,147,837 | Gottman | Feb. 21, 1939 |
| 2,232,744 | Thames | Feb. 25, 1941 |
| 2,364,918 | Roberson | Dec. 12, 1944 |
| 2,132,343 | Jarrett | Oct. 4, 1938 |
| 848,332 | Westervelt | Mar. 26, 1907 |